No. 781,485. PATENTED JAN. 31, 1905.
M. ABRAMOWITZ.
OPTICAL TOY.
APPLICATION FILED AUG. 27, 1904.
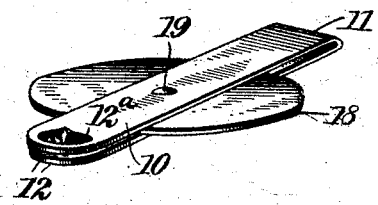
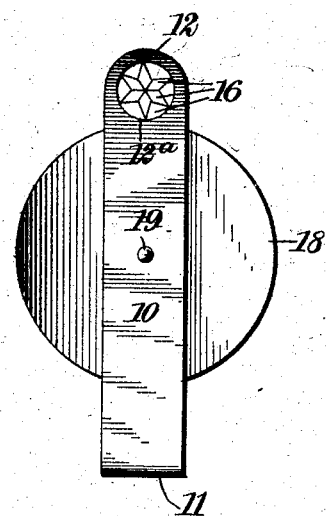
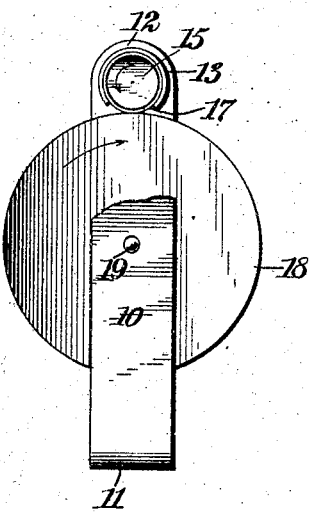
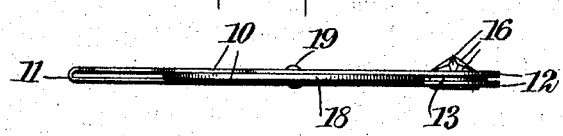
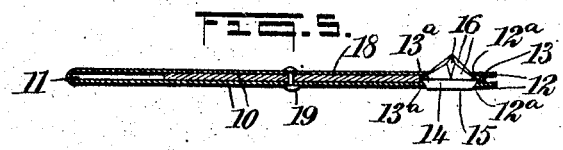
WITNESSES:
INVENTOR
Meyer Abramowitz
BY
ATTORNEYS No. 781,485.

Patented January 31, 1905.

UNITED STATES PATENT OFFICE.

MEYER ABRAMOWITZ, OF NEW YORK, N. Y., ASSIGNOR OF ONE-HALF TO BERNARD BRANNER, OF NEW YORK, N. Y.

OPTICAL TOY.

SPECIFICATION forming part of Letters Patent No. 781,485, dated January 31, 1905.

Application filed August 27, 1904. Serial No. 222,381.

*To all whom it may concern:*

Be it known that I, MEYER ABRAMOWITZ, a citizen of the United States, and a resident of the city of New York, borough of Manhattan, in the county and State of New York, have invented a new and Improved Toy, of which the following is a full, clear, and exact description.

My invention relates to toys, and more particularly to those depending upon optical effects. Its principal object is to provide an interesting device of this character.

It consists in the various features and combinations hereinafter described and claimed.

Reference is to be had to the accompanying drawings, forming a part of this specification, in which similar characters of reference indicate corresponding parts in all the figures.

Figure 1 is a perspective view of one embodiment of my invention. Fig. 2 is a side elevation thereof. Fig. 3 is a similar view looking from the opposite side with parts broken away. Fig. 4 is an edge elevation, and Fig. 5 is a central longitudinal section through the frame.

A frame is illustrated which includes opposite bars or elongated plates 10 10, conveniently formed by a continuous strip of sheet metal bent at 11 into parallelism. The separated ends of the bars may be rounded at 12, and adjacent to these ends are alined openings $12^a$. Connecting the bars and partially surrounding the openings therein is a ring 13, which is preferably of somewhat greater diameter than are the openings, so that ledges are left at $13^a$. In the chamber thus formed is mounted an eyepiece 14 of some transparent material, such as glass or quartz, preferably colored and having at one side a plane surface 15 and at the opposite side being cut or formed in a plurality of jewel-like facets 16, this portion projecting through one of the openings $12^a$. A portion of the ring 13 is omitted at 17, the edge of the eyepiece extending through this, at which point it contacts with a disk or operating member 18, shown as rotatably mounted upon a pin 19. The frame is preferably of sufficient length to project beyond the edge of the disk to furnish a handle portion.

The device being held in one hand and the eye applied to the eyepiece and an illuminated scene or object viewed this becomes visible, multiplied by the facets and of the color of the eyepiece. Moreover, because of prismatic refraction there is also seen a plurality of spectra, and upon rotating the eyepiece by means of the operating member both the objects and spectra revolve, producing a most attractive effect.

Having thus described my invention, I claim as new and desire to secure by Letters Patent—

1. A toy comprising a frame formed of opposite side bars connected at one end and having near the opposite end alined openings, a transparent eyepiece mounted between the openings and being provided with facets, and means carried between the bars for rotating the eyepiece.

2. A toy comprising a frame having separated openings, a transparent eyepiece provided at one side with a plurality of jewel-like facets mounted between the openings, and a rotatable disk coacting with the eyepiece.

3. The combination with a frame including opposite bars having alined openings, of a ring encircling the openings and connecting the bars, a portion of said ring being omitted, a transparent eyepiece mounted within the ring and having facets, and an operating member rotatable between the bars and coacting with the eyepiece.

In testimony whereof I have signed my name to this specification in the presence of two subscribing witnesses.

MEYER ABRAMOWITZ.

Witnesses:
SYLVANUS H. COBB,
EVERARD BOLTON MARSHALL.